3,109,224
METHOD OF MAKING BEARING PINS
Thomas E. Fearnside, Port Huron, Mich., assignor to Mueller Brass Co., Port Huron, Mich., a corporation of Michigan
Filed Oct. 11, 1960, Ser. No. 62,006
8 Claims. (Cl. 29—149.5)

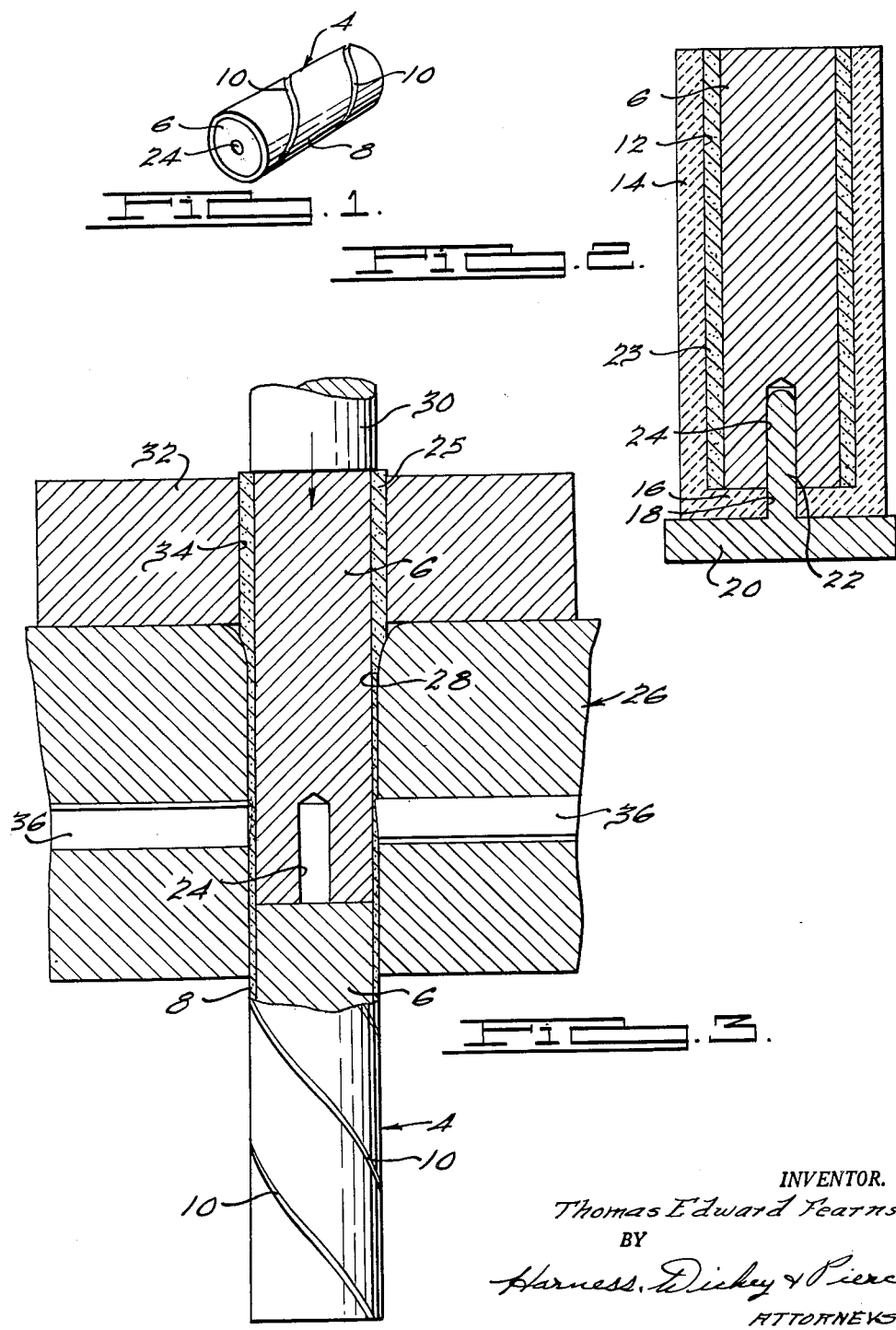

The present invention broadly pertains to bearing pins and more particularly to an improved bearing pin comprising a central hard metal core having a thin substantially uniform layer of a relatively dense copper alloy sintered thereon and tenaciously bonded thereto.

A primary object of the present invention is to provide an improved method of making bearing pins comprising a hard central core having a thin sintered layer of a bearing material on the periphery thereof and tenaciously bonded thereto.

Another object of this invention is to provide an improved method for making bearing pins employing powder metallurgical techniques for applying and tenaciously bonding a thin sintered bearing layer to a substantially hard central shaft forming therewith a bearing pin which is characterized by its high load carrying capacity, superior fatigue properties, improved durability, and which is of economical manufacture.

Still another object of the present invention is to provide an improved method for making bearing pins which utilizes a drawing die for densifying and sizing the sintered bearing layer and which drawing die operation can simultaneously be utilized for imparting oil grooves in the periphery of the bearing pin and impregnating the porous bearing surface with a lubricating oil.

A further object of the present invention is to provide an improved method for making bearing pins of a wide range of sizes and which method is simple, economical, and minimizes finish machining operations of the resultant pin.

Other objects and advantages of the present invention will become apparent from the following detailed description taken in conjunction with the accompanying drawings, wherein:

FIGURE 1 is a perspective view of a bearing pin made in accordance with the preferred practice of the present invention;

FIGURE 2 is a transverse vertical sectional view of a refractory mold employed for sintering and tenaciously bonding a thin layer of bearing material on the peripheral surface of a central core; and FIGURE 3 is a transverse vertical sectional view taken through a typical sizing die for densifying the sintered powder layer and for concurrently imparting spiral oil grooves in the surface thereof.

Referring now in detail to the drawings, a bearing pin 4 made in accordance with the preferred practice of the present invention is comprised of a central core or shaft 6 of a cylindrical configuration having a relatively thin bearing layer 8 around the peripheral surface thereof and tenaciously bonded thereto. A series of oil grooves 10 can be provided in the surface of the bearing layer 8 to facilitate distribution of a lubricating oil between the surface of the bearing layer and the part in sliding relationship thereon. The method herein described enables the manufacture of bearing pins of the type shown which vary over a wide range of diameters and lengths, depending on the specific operating conditions and apparatus in which they are to be employed.

The central core 6 of the bearing pin 4 may comprise any suitable substantially strong, tough, and hard metal which is able to sustain the loading applied to the surface of the bearing layer during operation. Central cores made of steel and particularly cold-rolled steel have been found to possess the requisite strength for a wide range of bearing pin operating conditions. However, cast iron rods have also provided satisfactory operation in a number of operating uses.

The bearing layer 8 is comprised of a relatively dense sintered matrix comprising predominantly copper which is alloyed with one or more of the so-called lubricity metals such as tin, lead, and antimony for example. Bearing pins having a bronze bearing layer containing from about 5% to 10% tin have been found particularly satisfactory for most operating conditions. The inclusion of varying proportions of lead in the bronze bearing layer has also produced bearing pins having excellent performance characteristics. The specific composition of the bearing layer 8 can be varied in accordance with the specific operating conditions under which the bearing pin is to be utilized thereby enabling the attainment of optimum performance. The powder blend can generally contain up to about 15% tin, up to about 25% lead, up to about 3% antimony, and the balance copper. The thickness of the bearing layer applied to the central core 6 can be varied to suit a particular use of the bearing pin. Generally, bearing pins having bearing layers of a thickness of about thirty thousandths of an inch provide excellent fatigue and operating characteristics under most operating conditions. Bearing layers having a thickness in excess of about thirty thousandths of an inch increase the quantity of the relatively expensive bearing materials required in the manufacture of the bearing pin and excessive thicknesses are objectionable from an economy standpoint. Bearing pins having bearing layers of a thickness as low as about fifteen thousandths of an inch have also been satisfactorily employed in a variety of different uses.

In accordance with the preferred practice of the present invention a typical bearing pin is made by inserting the central core 6 of the desired diameter and length in a cylindrical cavity 12 of a refractory mold 14 which is closed at its lower end as is shown in FIGURE 2. The closed end or base 16 of the mold 14 is provided with an aperture 18 which is disposed in substantial axial alignment with the center of the cylindrical cavity 12. The refractory mold 14 may be comprised of any suitable refractory material which will withstand the high sintering temperatures to which it is subjected and a conventional graphite mold constitutes a satisfactory material for this purpose. The base 16 of the refractory mold is removably supported on a suitable base plate 20 having a locating pin 22 projecting upwardly and substantially perpendicular therefrom. The locating pin 22 is adapted to extend through the aperture 18 in the base of the mold and projects inwardly in axial alignment with the center of the cylindrical cavity 12. To facilitate axial alignment of the central core 6 in the cylindrical cavity 12, one end of the central core is provided with a pilot bore 24 which is adapted to slidably engage the projecting end portion of the locating pin 22 assuring that a substantially uniform annular spacing is maintained between the periphery of the core and the surface of the cylindrical cavity.

With the central core 6 appropriately positioned in the cylindrical cavity 12 of the refractory mold 14, a powder blend 23 of copper powder and one or more powders consisting of the lubricity metals such as tin, lead, antimony, and mixtures thereof, is filled in the annular cavity between the periphery of the central core 6 and the surface of the cylindrical cavity 12. It is also contemplated within the scope of the present invention that in addition to substantially pure copper powder blended in appropriate proportions with tin, lead and/or antimony powders, pre-alloyed copper powders also can be employed in whole or in part to provide a powdered mixture having the desired composition. To facilitate the blending and sintering of the powder blend, it is preferred that the average particle size of the powders employed range from less than about 100 mesh to less than about 325 mesh. In addition to facilitating the attainment of substantially homogeneous powder mixtures, a powder having a relatively small particle size also facilitates filling the annular space between the central core and mold and enables more uniform packing of the powder blend therein. Although tamping of the powder blend into the annular space surrounding the central core will achieve a substantially dense and uniform layer of unsintered powder, it is preferred to employ vibratory methods to cause a settling and compacting of the loose powder blend in the annular space during the filling operation. This can be simply achieved, for example, by placing the assembled mold on a platen which is vibrated at sonic or ultrasonic frequencies during the filling operation.

After the annular space around the central core 6 has been completely filled with a substantially uniformly compacted powder mixture the base plate 20 and the locating pin 22 thereon is withdrawn from the base 16 of the mold which can thereafter be placed in a heated chamber or furnace and sintered at the appropriate elevated temperature. The temperature of sintering varies depending upon the composition of the powder blend employed. For example, powder blends containing about 90% copper and about 10% tin can be satisfactorily sintered at a temperature of about 1625° F. On the other hand, a powder blend composition containing 95% copper powder and 5% tin powder required a sintering temperature of about 1775° F. to achieve a satisfactory sintered layer. The inclusion of lead powder in a copper-tin powder blend causes a reduction of the sintering temperature whereby in a powder blend containing 90% copper, 5% tin, and 5% lead powder, a sintering temperature of only 1575° F. is required to achieve a satisfactory sintered product. Depending on the specific composition of the powder blend used, the sintering temperature will ordinarily range from about 1400° F. to about 1900° F. During the sintering operation the lower melting powder metal constituents such as tin, for example, melt and partially dissolve a portion of the copper powder forming a molten copper-tin alloy which wets the surface of the powder particles and the surface of the central core 6. On subsequent cooling the molten alloy solidifies accompanied by partial segregation of the metallic components therein and tenaciously bonds the particles to each other and to the surface of the central core 6. The resultant sintered powder layer 25 generally has a pore volume ranging from about 20% to 30% of the volume of the sintered layer.

At the expiration of the appropriate sintering period the refractory mold is removed from the heated chamber or furnace, and is permitted to cool after which the central core 6 having a substantially uniform thickness of the sintered powder layer 25 on the surface thereof is withdrawn from the cylindrical cavity. The resultant composite pin is thereafter subjected to a drawing die operation for densifying the sintered powder layer thereon and for accurately sizing the diameter of the pin. A suitable die assembly to achieve accurate sizing and densification of the sintered powder layer is illustrated in FIGURE 3. As shown in the drawing, a sizing die 26 is provided with a tapered sizing bore 28 which effects a gradual reduction in the diameter and densification of the sintered powder layer 25 as the steel core is pressed axially through the sizing bore 28 by means of a ram or punch 30. To facilitate alignment of the composite pin with the sizing bore 28 in the sizing die, a suitable guide block 32 is provided having a guide bore 34 which is disposed in axial alignment with the sizing bore 28 and is of a diameter corresponding substantially to the diameter of the sintered powder layer 25. During the sizing operation the sintered powder layer 25 is densified to a level preferably of at least about 95% resulting in a bearing layer 8 having a residuary pore volume of about 5% or less. Although a wide variety of satisfactory lubricants can be employed for lubricating the sizing die and the sintered powder layer during the sizing die operation, it is preferred to use a machine oil of about S.A.E. No. 20 grade which in addition to lubricating the die also impregnates the residuary pores in the bearing layer resulting in a pre-lubricated bearing pin.

It is also contemplated within the scope of the present invention that one or more suitable groove cutters 36 preferably of a tungsten carbide composition can be incorporated in the sizing die as shown schematically in FIG. 3 to impart one or more oil grooves 10 in the periphery of the bearing layer 8 of the bearing pin. The cutters 36 are adjustably mounted in the sizing die and are preferably adjusted to cut a groove having a depth corresponding to the thickness of the bearing layer 8 on the surface of the central core 6. The cutting edges of the cutters 36 can be disposed so as to impart one or more longitudinal oil grooves along the surface of the bearing pin or can be provided with a suitable pitch to impart a rotation to the bearing pin as it is pressed through the sizing die thereby imparting one or more helical oil grooves 10 in the surface thereof. The incorporation of one or more oil grooves 10 in the surface of the bearing pin 4 facilitates distribution of the lubricant between the surface of the bearing layer 8 and the overlying mating surface in bearing contact thereon during subsequent use.

In the specific sizing die shown in FIGURE 3 the bearing pins 4 are of relatively short length wherein the ram or punch 30 is employed to press the bearing pin inwardly until the face of the punch approaches the projecting cutting edges of the cutters 36. Thereafter the punch is withdrawn and a second bearing pin 4 is inserted in the guide bore 34 of the guide block 32 and the lower end of the second bearing pin bears against and axially presses the second bearing pin through the remaining portion of the sizing die. The resultant bearing pin obtained from the sizing die operation is accurately sized, smoothly finished, and prelubricated and requires virtually no additional machining operations for most uses.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of making a bearing pin comprising the steps of applying a relatively uniform layer of a finely particulated metallic bearing powder consisting of copper and a lubricity metal to the surface of a substantially cylindrical high strength metal core, sintering said core and said layer of powder thereon at an elevated temperature of from about 1400° F. to about 1900° F. for a period of time sufficient to tenaciously bond the particles of said powder together and to the surface of said core, and thereafter densifying and sizing the sintered said layer of powder by drawing the core through a sizing die, said sizing die provided with at least one grooving cutter for concurrently imparting a groove to the surface of said bearing pin during the drawing thereof through said die.

2. The method of making a bearing pin comprising the steps of applying a relatively uniform layer of a finely particulated metallic bearing powder to the surface of a substantially cylindrical high strength steel core, said powder comprising a mixture of copper powder and a metallic powder selected from the group consisting of tin, lead, antimony, and mixtures thereof, sintering said core and said layer of powder thereon at an elevated temperature ranging from about 1400° F. to about 1900° F. thereby tenaciously bonding the particles of said powder together and to the surface of said core, and thereafter densifying and sizing the sintered said layer of powder by drawing the core through a sizing die effecting a controlled reduction in the diameter of the sintered said layer without effecting a reduction in the diameter of said core.

3. The method of making a bearing pin comprising the steps of applying a relatively uniform layer of a finely particulated metallic powder to the surface of a substantially cylindrical high strength steel core, said powder comprising a blend of copper powder pre-alloyed with a metal selected from the group consisting of tin, lead, antimony, and mixtures thereof, sintering said core and said layer of powder thereon at an elevated temperature ranging from about 1400° F. to about 1900° F. thereby tenaciously bonding the particles of said powder together and to the surface of said core, and thereafter densifying and sizing the sintered said layer of powder by drawing the core through a sizing die effecting a controlled reduction in the diameter of said layer forming therewith a composite bearing pin having a bearing layer therearound with a pore volume of less than about 5%.

4. The method of making a bearing pin comprising the steps of applying a relatively uniform layer of a finely particulated metallic powder to the surface of a substantially cylindrical high strength steel core, said powder comprising a mixture of copper powder, copper powder pre-alloyed with a metal selected from the group consisting of tin, lead, antimony, and mixtures thereof, and a metallic powder selected from the group consisting of tin, lead, antimony, and mixtures thereof, sintering said core and said layer of powder thereon at an elevated temperature ranging from about 1400° F. to about 1900° F. thereby tenaciously bonding the particles of said powder together and to the surface of said core, and thereafter densifying and sizing the sintered said layer of powder by drawing the core through the sizing die of a circular cross section of a diameter less than the diameter of said layer forming a composite bearing pin having a bearing layer therearound of a pore volume less than about 5%.

5. The method of making a bearing pin comprising the steps of providing a high strength metal core having a cylindrical surface along at least a portion thereof, molding a relatively uniform layer of a finely particulated metallic powder consisting essentially of copper and a metal selected from the group consisting of tin, lead, antimony, and mixtures thereof, to said cylindrical surface of said core, sintering said layer and said core at an elevated temperature ranging from about 1400° F. to about 1900° F. thereby tenaciously bonding the particles of said powder together and to said cylindrical surface, and thereafter densifying and sizing the sintered said layer of powder by drawing the core through a sizing die effecting a controlled reduction in the thickness of the sintered said layer forming a composite bearing pin having a bearing layer therearound ranging from about .015 to about .030 inch thick.

6. The method of making a bearing pin comprising the steps of providing a core having a cylindrical surface along at least a portion thereof, molding a relatively uniform layer of a finely particulated metallic powder consisting essentially of copper and a metal selected from the group consisting of tin, lead, antimony, and mixtures thereof, to said cylindrical surface of said core, sintering said layer and said core at an elevated temperature thereby tenaciously bonding the particles of said powder together and to said cylindrical surface, and thereafter densifying and sizing the sintered said layer of powder by drawing the core through a sizing die, said sizing die provided with at least one grooving cutter for concurrently imparting a groove to the surface of said bearing pin during the drawing thereof through said sizing die.

7. The method of making a bearing pin comprising the steps of providing a high strength metal core having a cylindrical surface along at least a portion thereof, molding a relatively uniform layer of a finely particulated metallic powder consisting essentially of copper and a metal selected from the group consisting of tin, lead, antimony, and mixtures thereof, on said cylindrical surface of said core, sintering said layer and said core at an elevated temperature ranging from about 1400° F. to about 1900° F. thereby tenaciously bonding the particles of said powder together and to said cylindrical surface, the sintered said layer having a pore volume ranging from about 20% to about 30%, and thereafter drawing the core and the sintered said layer thereon through a sizing die effecting a controlled reduction in the diameter of said layer without any appreciable reduction in the diameter of said core thereby densifying said layer and reducing the pore volume thereof to a level of less than about 5%.

8. The method of making a bearing pin comprising the steps of providing a refractory mold having a cylindrically shaped cavity therein, placing a cylindrical steel core having a diameter less than said cavity in axial alignment with said mold, filling the annular space between said mold and said core with a finely particulated powder consisting essentially of copper and a metal selected from the group consisting of tin, lead, antimony, and mixtures thereof, vibrating said mold for compacting said powder therein, heating said mold to an elevated temperature from about 1400° F. to about 1900° F. and sintering said powder therein thereby tenaciously bonding the particles of said powder together and to the surface of said core forming therewith a sintered layer having a pore volume ranging from about 20% to about 30%, removing the composite pin comprising said core and the sintered said layer thereon from said mold and passing said composite pin through a sizing die having a diameter less than the outer diameter of the sintered said layer concurrently sizing the diameter and densifying the sintered said layer to a thickness ranging from about 0.015 to about 0.030 inch and reducing the pore volume thereof to a level less than about 5%.

References Cited in the file of this patent

UNITED STATES PATENTS

| | | |
|---|---|---|
| 1,103,382 | Seifert | July 14, 1914 |
| 2,065,618 | Sherwood | Dec. 29, 1936 |
| 2,187,348 | Hodson | Jan. 16, 1940 |
| 2,293,843 | Marvin | Aug. 25, 1942 |
| 2,299,192 | Tormyn | Oct. 20, 1942 |
| 2,398,719 | Rasmussen | Apr. 16, 1946 |